MULTI-APERTURE MAGNETIC CORE STORAGE DEVICE

Filed June 9, 1958

INVENTORS
JAMES M. BROWNLOW
MUNRO K. HAYNES
WARREN A. HUNT

BY Paul McElroy
ATTORNEY

3,142,036
MULTI-APERTURE MAGNETIC CORE STORAGE DEVICE

James M. Brownlow, Fishkill, Munro K. Haynes, Poughkeepsie, and Warren A. Hunt, Chappaqua, N.Y., assignors to International Business Machines Corporation, New York, N.Y., a corporation of New York Filed June 9, 1958, Ser. No. 740,778
6 Claims. (Cl. 340—174)

This invention relates to storage devices, and more particularly to magnetic storage devices operable by coincident flux techniques.

The prior art includes magnetic cores fabricated of material having two remanent states which are employed to store representations of binary information wherein the transfer from one state to the other is accomplished by coincident flux techniques. Cores of the coincident flux type are known which employ bias windings for the purpose of preventing signals of less than predetermined magnitudes from switching the core (or portions thereof) from one state to another. The latter type cores require current sources for energizing the bias windings thereof to thus provide a M.M.F. which creates the bias flux in the core. In order to reverse the state of such a core, the input signals applied thereto must coincidentally produce a M.M.F. sufficient to overcome the bias M.M.F. and drive the core material into saturation in the opposite remanent state.

Accordingly, the principal object of the present invention is to provide a novel magnetic core of the coincident flux type having the advantages of such cores employing bias windings, but which eliminates the necessity for such windings.

Another object is to provide a novel magnetic core of the coincident flux type wherein the geometrical arrangement of the material comprising the core serves to bias said material in either of two remanent states.

A further object is to provide a novel magnetic core comprising a plurality of materials each having two remanent states, and each of said materials exhibiting a hysteresis curve uniquely different from the other said materials.

Another object is to provide a novel magnetic core having input and output portions, wherein the material comprising said input portion has a higher coercive force than said output portion.

It is also an object to provide a magnetic core having a first portion thereof comprising material annealed below the Curie point thereof in the absence of an external magnetic field, and having a second portion comprising material annealed below the Curie point thereof in the presence of an external magnetic field sufficient to saturate said second portion.

An additional object is to provide a novel magnetic core having a selection portion and a storage portion, said selection portion comprising material wherein the flux density of the remanent state is approximately equal to the flux density of the demagnetized state, and said storage portion comprising material wherein the flux density of the remanent state is approximately equal to the flux density of the saturation state.

Another object is to provide a novel magnetic core fabricated of a ferrite material such as magnetite containing cobalt and defining a sense and a selection aperture, material adjacent said sense aperture exhibiting a substantially rectangular hysteresis curve and the material adjacent said selection aperture exhibiting a hysteresis curve wherein the demagnetized state and the remanent state are substantially of the same magnitude.

The present invention provides a multi-path magnetic core having a sense aperture and a selection aperture and appropriate winding means therefor. The material adjacent the sense aperture is annealed to provide a substantially rectangular hysteresis curve to facilitate storage of information in the core. Annealing of the material adjacent the selection aperture is controlled to exhibit a hysteresis curve having a greater coercive force than the material defining the sense aperture. The hysteresis curve of the material around the selection aperture is pinched or constricted at the center thereof so that the magnitude of the flux density of the remanent state is very small and is approximately equal to the magnitude thereof when the material is demagnetized. In the quiescent state, the remanent state of the material adjacent the selection aperture is substantially the same as the demagnitized condition so that the application of a half select pulse to a selection winding does not alter the flux pattern of said material. As a result of this action signals generated in the sense winding due to the half select signals are minimized. The core is said to be structurally biased since the material adjacent the sense aperture cannot be switched until a drive M.M.F. is applied to the selection winding which has a magnitude several times that required to saturate the material adjacent the sense aperture.

Other objects of the invention will be pointed out in the following description and claims and illustrated in the accompanying drawings, which disclose, by way of example, the principle of the invention and the best mode, which has been contemplated, of applying that principle.

Figure 1:
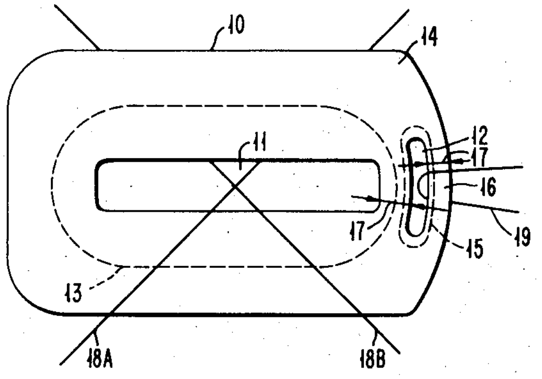
FIG. 1 illustrates the physical arrangement of the novel magnetic core.

Referring more particularly to FIG. 1, the geometrical arrangement of the novel magnetic core 10 is shown. The core 10 may be molded or may be punched or cut from a sheet of ferrite material. The core may also be fabricated as a thin film of ferrite material.

A selection aperture 11 and a sense aperture 12 are provided through the core material. The selection aperture 11 is arranged to provide a longer flux path 13 through the material 14 than the flux path 15 through the material 16 around the sense aperture 12. It will be shown hereinbelow that the ratio of the lengths of the flux paths 13 and 15 determine the switching speed of the entire core. The width 17 of the material 16 around the sense aperture is considerably less than the width of the material 14 adjacent the selection aperture. The width of the material adjacent the selection aperture must be greater in order to prevent this section of the core from reaching saturation during the selection of the core. The reason that the material 14 cannot be driven into saturation is explained hereinbelow with respect to FIG. 3.

The material from which the core is constructed may be magnetite containing cobalt having the formula $Co_xFe_{3-x}O_4$. Ferrite ceramics consisting of grains of cubic spinel can be fabricated in the composition range $0 \leqslant x \leqslant 1$. The cobalt content is not critical from the standpoint of the operation of the novel core, but must be sufficient in order that the material will exhibit the appropriate hysteresis curves as shown in FIG. 2.

Figure 2:
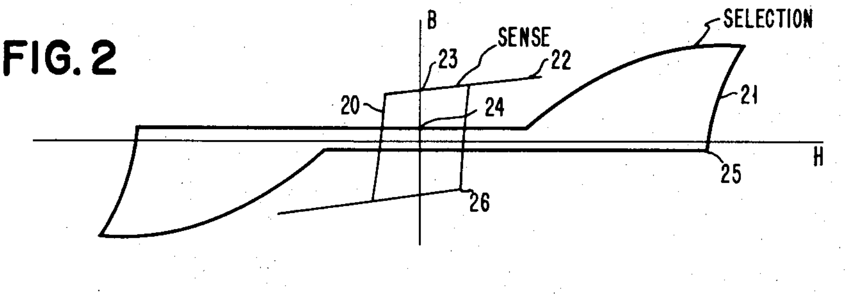
FIG. 2 illustrates the superposition of the hysteresis curves of the two parts of the structure of the invention.

FIG. 2 is a superposition of the hysteresis curve 20 exhibited by the material 16 adjacent the sense aperture 12, and the hysteresis curve 21 exhibited by the material 14 adjacent the selection aperture. In FIG. 2 it is to be noted that the magnitude 22, for example, of the flux in the material adjacent the sense aperture under saturation conditions is substantially eual to the magnitude 23 in the remanent state. With respect to the hysteresis curve 21 of FIG. 2, note that in the remanent state the magnitude 24 of the flux density of the material adjacent the selection aperture is very close to the demagnetized condition. Note also, that the coercive force 25 of the material 14 around the selection aperture is substantially greater than the magnitude 26 of the coercive force of the material around the sense aperture. The importance of these features will become evident in the discussion of FIG. 3.

The hysteresis curves 20 and 21 of FIG. 2 are brought about in different segments of the core 10 of FIG. 1 by properly controlling the annealing process. The typical rectangularly shaped hysteresis curve 20 exhibited by the material adjacent the sense aperture is brought about by the application of a strong magnetic field to the material 16 of FIG. 1 when the core is annealed below the Curie point. The strong external magnetic field may be provided during the annealing process by the application of a large current to a winding linking the sense aperture. The magnitude of the externally applied magnetic field must be sufficient to saturate the material surrounding the sense aperture.

The hysteresis curve 21 of FIG. 2 is provided by annealing the material 14 around the selection aperture below its Curie point in the absence of any external magnetic field. In this situation the domain structure at zero applied field, which appears when the material is first cooled below its Curie temperature, is essentially frozen into the body of the material and thus the remanent state will be substantially a demagnetized condition.

A more detailed description dealing with constricted hysteresis curves in ferrites containing cobalt and the thermal magnetic treatment of such ferrites is found in the published article: "Ferrites With Constricted Loops and Thermal Magnetic Treatment," by O. Eckert, Proceedings of the Institution of Electrical Engineers (London), 1957, vol. 104, Part B, which is incorporated herein by reference.

Figure 3:
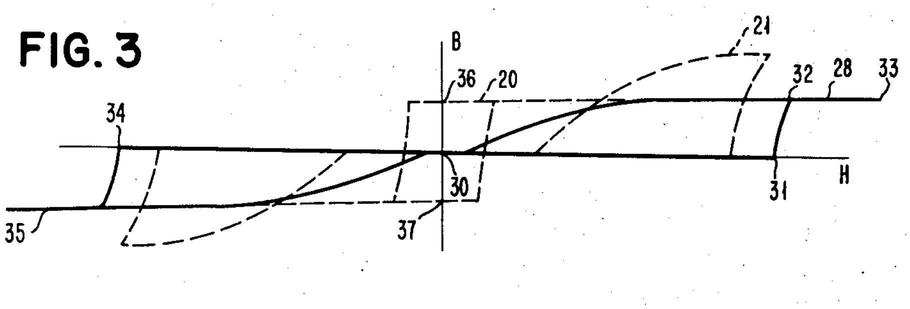
FIG. 3 is the actual hysteresis curve of the composite structure of the sense region in series with the selection region of the core.

Referring more particularly to FIG. 3, the actual hysteresis curve for the composite structure is shown in solid lines. The dashed lines of FIG. 3 represent the hysteresis curves 20 and 21 described above. The hysteresis curve 28 represents the flux path through the material adjacent the sense aperture in series with the flux path through the material around the selection aperture. The curve 28 is obtained by adding the currents of curves 20 and 21 at constant flux values.

In the quiescent state, that is, when a selection drive M.M.F. is not being applied to the core, the core exists at point 30 on the hysteresis curve of FIG. 3. The application of a selection M.M.F. of a predetermined polarity drives the material of the core through points 31 and 32 to point 33, assuming that the magnitude of the selection M.M.F. is equal to the magnitude indicated by point 33. Upon the removal of the selection M.M.F. the material of the core returns from point 33 to point 30 by transversing the curved portion between these points. When a selection M.M.F. of the opposite polarity is applied to the core, the material traverses the hysteresis curve on the path identified by points 30, 34 and 35. Upon the removal of the selection M.M.F., the material of the core returns from point 35 via the curved path shown in FIG. 3 between points 35 and 30.

Accordingly, a binary 1, for example, may be stored in the core by applying thereto a selection pulse which drives the material from point 30 to point 33. Upon the cessation of this selection pulse, the majority of the material will return to the remanent state at point 30. However, the material adjacent the sense aperture will return to the remanent state at point 36. Similarly, a representation of a binary 0 may be stored in the core by applying a selection M.M.F. which drives the material from point 30 to point 35. Upon the cessation of such a selection pulse, the material adjacent the selection aperture will return to the remanent state at point 30, whereas the material surrounding the sense aperture returns to the remanent state at point 37 of FIG. 3.

With respect to FIG. 3, it is to be noted that the application of a selection M.M.F., such as a half select signal, having a magnitude less than the magnitude indicated by point 31 is incapable of materially affecting the flux pattern in the core. Since the magnitude 31 is substantially greater than the M.M.F. necessary to drive the material surrounding the sense aperture into saturation, it is evident from FIG. 3 that the novel core provides a means for discriminating against half select signals and other signals which are insufficient to drive the material 14 adjacent the selection aperture beyond point 31 of FIG. 3. Thus it can be said that by providing a single magnetic core wherein separate portions there of exhibit hysteresis curves of the type shown in FIG. 2 a structure is provided wherein a biasing means is essentially built into the core.

Figure 4A:
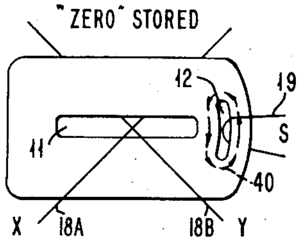
FIG. 4A illustrates the flux pattern in the core representing the storage of a binary zero.
Figure 4B:
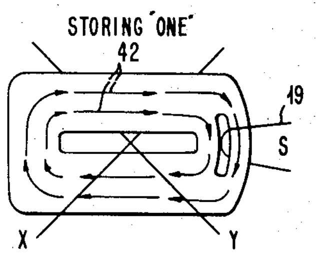
FIG. 4B depicts the flux pattern during the writing of a binary 1 in the core.
Figure 4C:
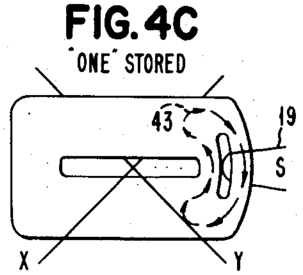
FIG. 4C shows the flux pattern representing the storage of a binary 1 in the core.

The operation of the novel core may be understood by considering FIGS. 4A–4C in conjunction with the hysteresis curve of FIG. 3. FIG. 4A illustrates the flux pattern existing in the core when a representation of a binary 0 is stored therein. FIG. 4B illustrates the flux pattern in the core during the application of selection currents thereto when a representation of a binary 1 is actually being stored. FIG. 4C illustrates the flux pattern existing in the core after the selection currents have been removed and the core is storing a representation of a binary 1.

Referring to FIG. 4A, the dashed lines 40 surrounding the sense aperture 12 represent flux lines which indicate the storage of a representation of a binary 0. The material of the core adjacent the sense aperture may be said to exist at the remanent state indicated by point 37 of FIG. 3. Since there are no selection currents being applied to the selection windings 18A and 18B, the material adjacent the selection aperture 11 exists at point 30 of FIG. 3.

In order to store a binary 1 in the novel core selection currents are applied to selection windings 18A and 18B and the total M.M.F. provided by the selection currents must be of a magnitude greater than that indicated by point 31 of FIG. 3. During the application of the selection currents to the selection windings, a flux pattern is set up in the core in a direction indicated by the arrows on the dashed lines 42 of FIG. 4B. The selection currents drive the material adjacent sense aperture 12 from point 37 of FIG. 3 to point 33, as explained hereinabove Upon the cessation of the selection currents indicated in FIG. 4B, the material adjacent the selection aperture returns from point 33 to point 30 of FIG. 3 and thus is essentially demagnetized. However, the material surrounding the sense aperture returns from point 33 to the remanent state at point 36 thereby indicating the storage of a binary 1. In FIG. 4C the flux lines 43 indicate the familiar crescent-shaped flux pattern around the sense aperture 12. A comparison of FIGS. 4A and 4C shows that in FIG. 4C the direction of the flux has been reversed.

A complete description of the phenomenon by which the crescent-shaped flux pattern of FIG. 4C is formed is set forth in the coincidence flux system described and claimed in co-pending application Serial No. 546,180, filed November 10, 1955, now U.S. Patent No. 2,869,112, which is incorporated herein by reference.

As stated above, the flux pattern of FIG. 4C is indicative of the storage of a binary 1. In order to read out the binary 1 and also to store a 0 in the core, selection currents are applied to the selection windings in a direction opposite to the direction in which currents were applied to the windings to store the binary 1. During the application of selection currents to the selection windings when the core is being read out, a flux pattern is established in the core similar to the pattern illustrated in FIG. 4B, but in a direction opposite to the direction indicated by the arrows on flux lines 42. When the core is switched from the flux pattern of FIG. 4C to a pattern wherein the direction of the flux is opposite to that of FIG. 4B, it is obvious that the direction of the flux in the leg encompassed by sense winding 19 is reversed. A flux reversal in this leg induces a voltage signal in the sense winding 19 which may be utilized by other apparatus as an indication that the core was previously storing a representation of a binary 1. Following the removal of the selection currents which produce read out of the core, the flux pattern illustrated in FIG. 4A is re-established and the core is now storing a representation of a binary 0.

With respect to the hysteresis curve of FIG. 3 shown in solid lines, it is to be noted that in the quiescent state there is essentially no flux in the material of the core adjacent the selection aperture 11. The only flux lines present in the core at this time are found in the material adjacent the sense aperture.

The principal advantage of the core is evident from the hysteresis curve of FIG. 3 from which it is obvious that the application of a selection M.M.F. having a magnitude less than the magnitude represented by either of the points 31 or 34 (depending on the polarity of the selection currents) will not cause any material of the structure to the switched from one state of magnetization to another. The time required to switch the novel core is determined by the magnitude of the selection M.M.F. which exceeds the point 31, for example (or 34), during the selection of the core. Since the switching speed is proportional to the magnitude by which the selection M.M.F. exceeds point 31, the greater the excess M.M.F. provided, the faster the core can be switched.

The magnitude of M.M.F. represented by either of the points 31 or 34 of FIG. 3 is a function of the ratio of the lengths of the flux paths 13 and 15 of FIG. 1. The reason for this is that the material around the sense aperture is essentially in series with the material around the selection aperture when it is attempted to drive the core into saturation. Although the ratio of these flux paths is not critical, it has been determined that a ratio of 5 to 1 is suitable for most practical purposes. By increasing the ratio, the magnitude represented by point 31, for example, of FIG. 3 is increased. Thus by employing a ratio of 5 the magnitude 31 is sufficiently great to provide adequate discrimination against half selection signals as described hereinabove.

As pointed out above, the switching time of the core is determined by the amount by which the driving M.M.F. applied to the selection windings exceeds point 31 of FIG. 3. Additionally, it was noted that the magnitude of point 31 is determined by the ratio of the length of the flux path around the selection aperture to the length of the flux path around the sense aperture. Accordingly, it is now clear that the ratio of the lengths of the two flux paths essentially determines the switching speed of the novel core.

It is now evident that an essential feature of the invention is that the material surrounding the selection and sense apertures respectively exhibit hysteresis curves similar to the curves 21 and 20 of FIG. 2. It has been noted that one method of providing the appropriate curves is to apply an external magnetic field to the material adjacent the sense aperture when the core is annealed below the Curie temperature of the material. The same result may be achieved by constructing a multi-component core wherein materials exhibiting the requisite hysteresis curves are assembled to form a single core utilizing the construction technique shown in FIG. 3 of application Serial No. 693,980, filed November 1, 1957, now U.S. Patent No. 2,982,948, which is incorporated herein by reference. For example, a first portion of material having a sense aperture pierced therein and exhibiting a hysteresis curve, similar to curve 20 of FIG. 2, may be assembled with a second portion of material which exhibits a hysteresis curve similar to curve 21 of FIG. 2. The second portion would provide a selection aperture which may be embraced by selection windings. In order to facilitate assembly, the division between the two portions forming the core could be made at the extreme right-hand extremity of the selection aperture 11 of FIG. 1 so that the material surrounding the selection aperture would initially be formed in a U shape. This segment could then be assembled with the material which provides the sense aperture to comprise a multi-component core.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A storage device magnetic core having material capable of assuming either of two stable states and defining first and second apertures, said apertures being arranged to provide a substantially longer flux path around said first aperture than the flux path encompassing said second aperture, said material defining said second aperture exhibiting a substantially rectangular hysteresis curve, said material adjacent said first aperture exhibiting a hysteresis curve having a substantially demagnetized remanent state, the coercive force of the material adjacent said first aperture being greater than that of the material surrounding the second aperture, and means for applying a drive M.M.F. to the core to switch the material from one state of magnetization to another.

2. A magnetic storage device fabricated of magnetite material containing cobalt, said material having a storage portion having an aperture therein forming a closed flux path and a switching portion, said storage portion exhibiting a substantially rectangular hysteresis curve whereby the storage of information is represented by two remanent states, said switching portion having said aperture therein and having a remanent state wherein the flux density in the material is negligible as compared to the remanent state of said storage portion, the material of said switching portion having a greater coercive force than the material of said storage portion, and means for applying a drive M.M.F. to said core, whereby the material of said storage portion is switched from one remanent state to the other only when said drive M.M.F. exceeds the coercive force of said switching portion.

3. A storage device comprising a magnetic core having first material means defining a first closed flux path and second material means including said first material means defining a second closed flux path, the first material means of said second material means being capable of attaining two states of remanent magnetization and exhibiting a high retentivity and a given coercive force, the remaining portion of said second material means exhibiting, relative to the first material means, a low retentivity and a high coercive force with two substantially demagnetized stable states of remanent magnetization, driving signal means for selectively saturating said second material means so as to alter the remanent state of said first material means, whereby driving signals incapable of saturating said second material means are prohibited from influencing the remanent state of said first material means, and sensing means coupled to said first closed flux path.

4. A storage device as set forth in claim 3 wherein the length of said second closed flux path is several times greater than the length of said first closed flux path.

5. A storage device as set forth in claim 3 wherein the material of the remaining portion of said second material means is a cobalt alloy.

6. A magnetic core comprising first material means capable of attaining two states of remanent magnetization and exhibiting a high retentivity and a given coercive force and second material means including said first material means defining a closed flux path, the portion of said second material means without said first material means exhibiting, relative to the first material means, a low retentivity and a substantially higher coercive force than said given coercive force with two substantially demagnetized stable states of remanent magnetization.

References Cited in the file of this patent

UNITED STATES PATENTS

| | | |
|---|---|---|
| 2,170,694 | Perry | Aug. 22, 1939 |
| 2,781,503 | Saunders | Feb. 12, 1957 |
| 2,811,710 | Demer | Oct. 29, 1957 |
| 2,825,892 | Duinker | Mar. 4, 1958 |
| 2,886,790 | Snyder | May 12, 1959 |
| 2,967,294 | Moerman | Jan. 3, 1961 |

OTHER REFERENCES

Publication: "A Basic Magnetic Circuit Element—Potter Magnistor," Sales flyer of Potter Instrument Co., Inc., 115 Cutter Mill Road, Great Neck, N.Y., received by U.S. Patent Office Library Nov. 28, 1955.

Publication: "Multihole Ferrite Core Configurations and Applications," by Abbott and Suron, Proceedings of the IRE, vol. 45, No. 8, pp. 1081–1093, Aug. 9, 1957.